T. J. Gifford.
Scaffold Bracket.
N° 27,441. Patented Mar. 13, 1860.
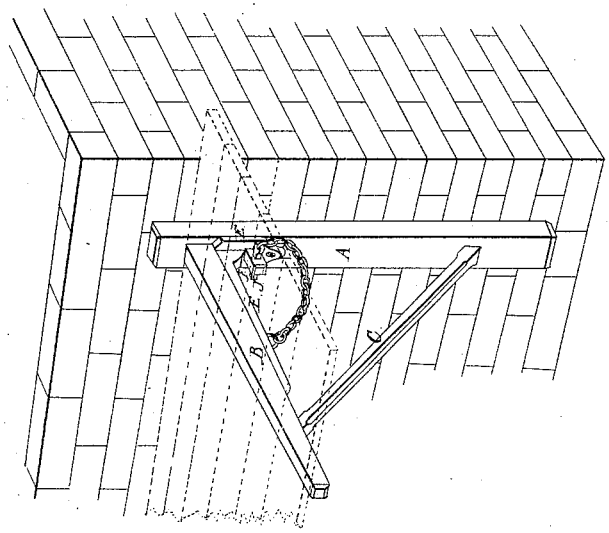
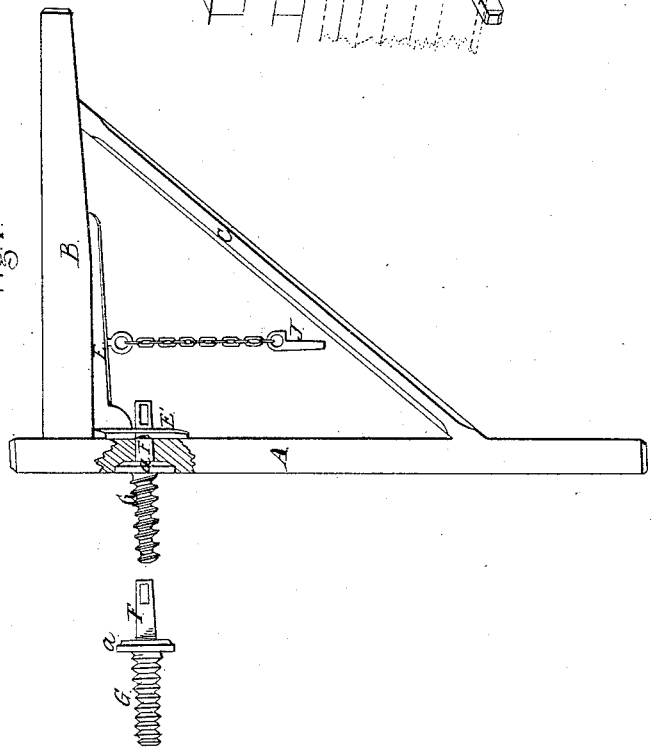
Witnesses:
R. S. Spencer
J. W. Coombs
Inventor:
T. J. Gifford
per Munn & Allumier

UNITED STATES PATENT OFFICE.

T. J. GIFFORD, OF SALEM, MASSACHUSETTS.

SECURING SCAFFOLDING-BRACKETS TO BUILDINGS.

Specification of Letters Patent No. 27,441, dated March 13, 1860.

*To all whom it may concern:*

Be it known that I, T. J. GIFFORD, of Salem, in the county of Essex and State of Massachusetts, have made a new Mode of Securing Brackets to the Sides of Buildings for Scaffolding, or Staging, &c.; and I do hereby declare that the following is a full, clear, and exact description thereof, reference being had to the accompanying drawings, forming a part of this specification, in which—

Figure 1 represents a side elevation of a bracket showing my improved mode of attaching the same to wooden or other buildings; a portion of the bracket is removed to show the screw with its collar seated into the same. Fig. 2 represents the screw detached from the bracket of Fig. 1. Fig. 3 is a perspective view of my bracket when attached and locked to a brick building shown in red lines. The brackets are specially intended for wooden buildings, although they may be attached to brick buildings by inserting wooden wedges into the same for receiving the screw.

Similar letters of reference indicate corresponding parts in the above figures.

The object of my invention is to enable the workmen to erect a staging with greater ease and with the same security than by the present mode; and to secure the brackets, upon which the foot boards are laid, to a wooden building, either before or after plastering, which in the latter instance cannot be done with the present mode of attaching the brackets. The attachment can be readily made by one man, and the staging can be removed and the whole taken down with ease and facility.

My invention for effecting this, consists in constructing the bracket itself in a peculiar manner; and in the use of a screw having a collar and square eyed head, which screw is driven into the building at suitable places, and the bracket attached to the same by a wedge key bolt in the manner herein described and represented.

To enable those skilled in the art to fully understand my invention, I will proceed to describe its construction and the manner of using it.

The present method of securing brackets to a wooden building, is by a rod secured permanently to the bracket having a screw thread on its end, which rod is inserted through a hole, bored entirely through the timber, and secured by a nut from the inside. This requires two men to effect an attachment, one being on the inside, while the other holds the bracket until it is screwed up tight. This forms a secure attachment, but it cannot be made after the house is plastered, and the costly method of using poles and nailed brackets is the only resort.

My bracket consists of a vertical piece, A, and horizontal piece B, for the foot boards, shown in red lines, Fig. 3, and diagonal brace C; and in the knee of this bracket is bolted a second bracket shaped plate E, of suitable metal, having a wide plate or lip E′ with a square hole punched through it which corresponds to a hole through the upright timber A, for receiving the square head F, of screw G. This screw is made of sufficient size and strength to support the weight to be put upon the staging, with deep wood screw threads cut upon it to prevent it from being drawn out. Between the screw stem, and the square stem is a button $a$ which is fitted into a recess in piece A, when the parts are brought together; the square stem or head F has an oblong tapering hole punched through it, which receives the wedge key J, on the outside of the piece A, for locking the screw to the bracket, and the bracket to the side of the building. The key J is attached to the bracket by a chain so that it will not get displaced, and will be always handy for use.

Now to erect a staging holes are bored into the timber of the building at suitable points along the same, and the screw of Fig. 2 inserted, with a wrench, or a lever, passed through the eye, which receives the key J, when the screws have been driven up to their heads $a$ the brackets are attached by forcing the square stem F through the piece A, and locking the same by inserting the key J, as above described; the foot boards are then laid over the pieces B and the staging is complete.

Having thus described my invention, what I claim and desire to secure by Letters Patent, is,

The combination with bracket A, B, C, and the knee plate E, E′, of the screw G, $a$ F and key J all arranged in the manner, and for the purposes set forth.

T. J. GIFFORD.

Witnesses:
 CHAS. E. SYMONDS,
 WM. P. BUFFUM.